United States Patent [19]

Pav et al.

[11] 4,394,793
[45] Jul. 26, 1983

[54] ROLL FOR USE IN CALENDERS OR THE LIKE

[75] Inventors: Josef Pav; Erhard Münch, both of Krefeld, Fed. Rep. of Germany

[73] Assignee: Kleinewefers GmbH, Krefeld, Fed. Rep. of Germany

[21] Appl. No.: 269,986

[22] Filed: Jun. 3, 1981

[30] Foreign Application Priority Data

Jun. 14, 1980 [DE] Fed. Rep. of Germany ...... 3022491

[51] Int. Cl.³ .................... B21B 13/14; B21B 29/00
[52] U.S. Cl. .................................................. 29/116 AD
[58] Field of Search .................... 29/113 AD, 116 AD

[56] References Cited

U.S. PATENT DOCUMENTS 4,228,571 10/1980 Biondetti ........................ 29/116 AD
4,241,482 12/1980 Biondetti ........................ 29/116 AD

*Primary Examiner*—Eugene F. Desmond
*Attorney, Agent, or Firm*—Kontler, Grimes & Battersby

[57] ABSTRACT

A calender roll wherein a stationary shaft is spacedly surrounded by a cylindrical shell and carries a row of bearing elements which are movable by pairs of cylinder and piston units and have convex surfaces formed with pairs of fluid-filled pockets adjacent to the internal surface of the shell. Each pocket receives pressurized hydraulic fluid from the cylinder chamber of a different unit, and the cylinder and piston units for each bearing element are adjacent to each other, as considered in the circumferential direction of the shell. Those portions of the pockets which are remotest from a symmetry plane including the axis of the shell and extending between the pockets of each pair are bounded by arcuate lands. The lands which extend circumferentially of the shell are parallel to each other, and the pockets of each pair are separated from each other by a land which is halved by the symmetry plane. The bearing elements are separated from each other by narrow gaps extending circumferentially of the shell and bounded by parallel side faces of the respective bearing elements. The magnitude of forces acting upon the internal surface of the shell is substantial in the regions of the gaps and increases gradually toward the central portions of the bearing elements, as considered in the axial direction of the shell.

22 Claims, 5 Drawing Figures

Fig.1
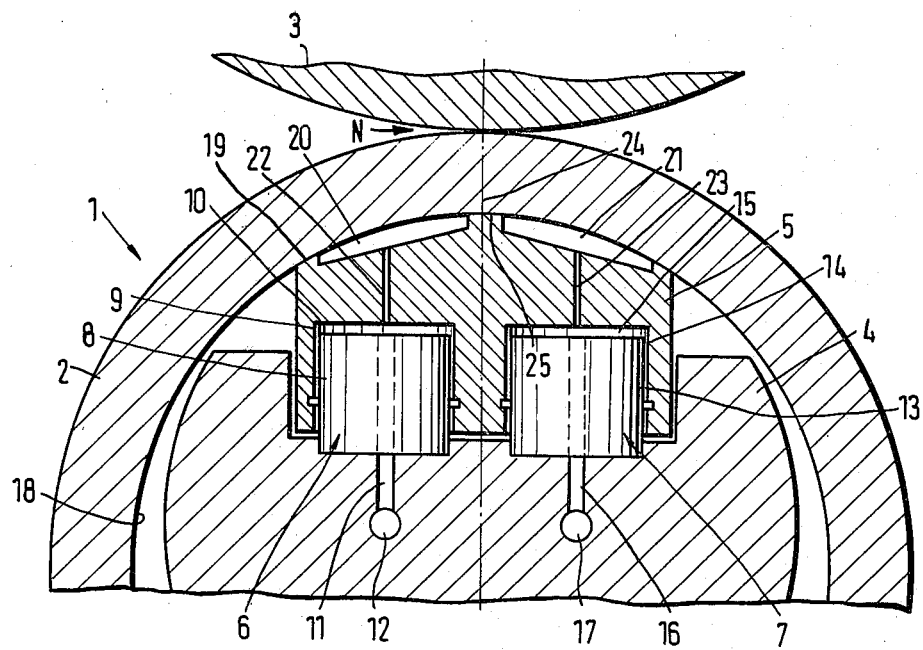
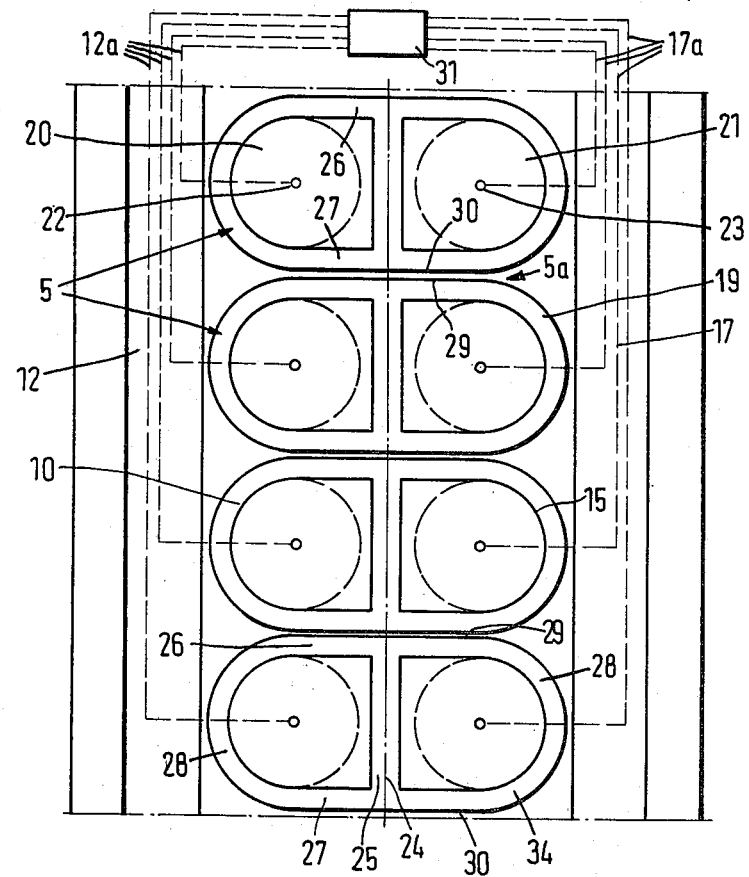
Fig.2

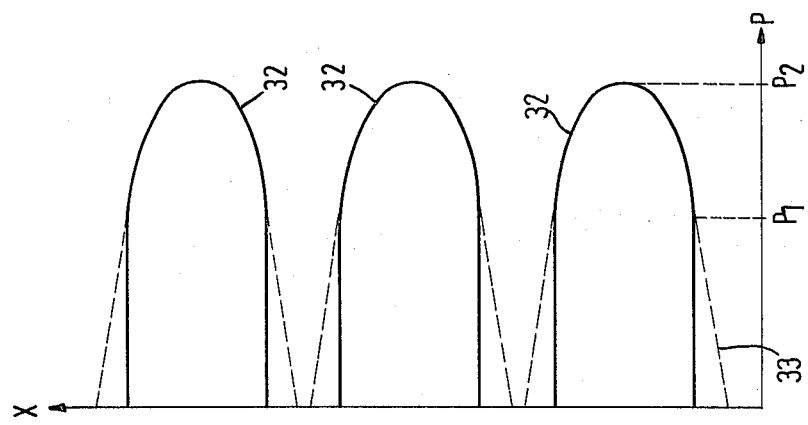
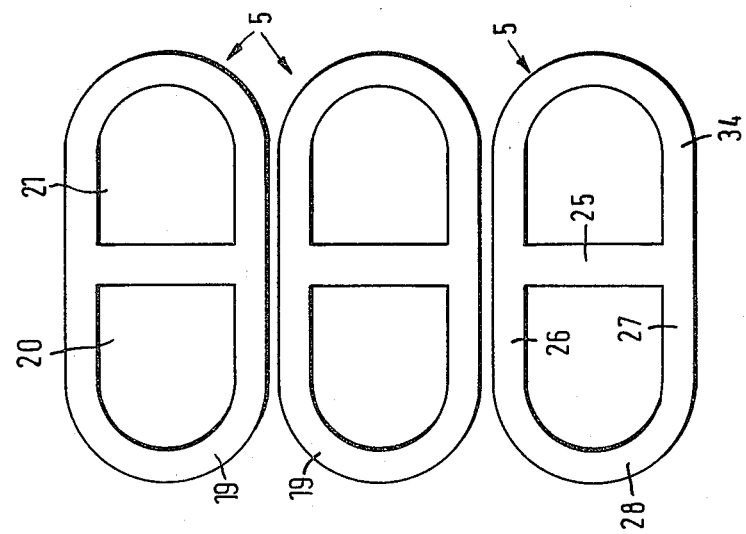
Fig. 3a
Fig. 3b

ROLL FOR USE IN CALENDERS OR THE LIKE

CROSS-REFERENCE TO RELATED CASES

Rolls which can be used in calenders or the like and are similar to the roll of the present invention are disclosed in commonly owned copending applications Ser. Nos. 097,961 (filed Nov. 28, 1979 by Pav et al.), 196,123 (filed Oct. 10, 1980 by Pav et al., now U.S. Pat. No. 4,290,353 granted Sept. 22, 1981.), and 191,691 (filed Sept. 29, 1980 by Weidinger et al. now U.S. Pat. No. 4,328,744 granted May 11, 1982).

BACKGROUND OF THE INVENTION

The present invention relates to rolls for use in calenders or like machines, and more particularly to improvements in rolls of the type wherein a cylindrical shell spacedly surrounds a stationary carrier and is supported by a row of bearing elements which, in turn, are supported by the carrier. Still more particularly, the invention relates to improvements in a roll wherein the bearing elements are adjustable relative to the carrier by fluid-operated pressure generating devices so as to prevent or to compensate for deformation of the shell in response to pressure which is applied thereto by a running web of the material to be treated, by a complementary roll or by a non-rotating body.

Rolls of the above outlined character are used in a variety of machines including calenders, presses for paper or cellulose, printing machines, rolling mills for steel, plastic or the like, as well as glazing machines.

German Offenlegungsschrift No. 26 08 646 discloses a roll wherein the carrier supports a row of spaced-apart bearing elements for the rotary shell and each bearing element is movable relative to the carrier by a discrete pressure generating device in the form of a fluid-operated motor. The purpose of the bearing elements is to reduce the extent of flexing of the shell under pressure and/or to uniformize the pressure between the roll and a complementary roll or the like. Each pressure generating device comprises a plunger which is fixed to the carrier and extends into a cylinder chamber of the corresponding bearing element, or a cylinder which is fixed to the carrier and defines a cylinder chamber for a plunger which is secured to the respective bearing element. The bearing elements have convex surfaces of circular or polygonal outline, and such surfaces are adjacent to the internal surface of the shell. If the convex surfaces of the bearing elements have a rectangular outline, their longer sides are parallel with the axis of the shell. As a rule, each convex surface is formed with four pockets or recesses which receive pressurized fluid from the respective cylinder chamber and are separated from each other by a pair of intersecting ribs which together form a substantially cruciform land. The pockets form part of a hydrostatic seal between the bearing element and the cylindrical internal surface of the rotary shell. The flow of fluid from the cylinder chamber of a pressure generating device into the pockets of the respective bearing element is throttled, e.g., by forming the bearing element with a flow restricting passage, channel or bore which connects the pockets with the cylinder chamber.

If the aforementioned convex surfaces of the bearing elements have a rectangular outline, with the longer sides parallel to the axis of the shell and with the shorter sides extending in the circumferential direction of the shell, the magnitude of forces which develop between the bearing elements and the shell varies very little or not at all, as considered in the axial direction of the roll. Otherwise stated, the magnitude of forces which act between a given bearing element and the adjacent portion of internal surface of the shell is constant, as considered in the axial direction of the shell. The magnitude of such forces varies much more when the concave surfaces of the bearing elements have a circular outline. Moreover, and since the pressure of fluid in the cylinder chambers of the pressure generating devices cannot be increased at will, the magnitude of forces acting upon the shell per unit length of the roll is also limited, i.e., a conventional roll cannot compensate for any and all pressures which are exerted upon and tend to flex the shell when the roll is in actual use in a calender, rolling mill or the like.

OBJECTS AND SUMMARY OF THE INVENTION

An object of the invention is to provide a novel and improved roll wherein a shell surrounds a stationary carrier for a row of bearing elements and which is constructed and assembled in such a way that the magnitude of forces acting upon the shell per unit length of the roll can be increased well beyond that of forces acting upon the shell of a conventional roll, even if the pressure of fluid in the pressure generating devices for the bearing elements of the novel roll is not higher than in heretofore known rolls.

Another object of the invention is to provide novel and improved bearing elements for use in a roll of the above outlined character.

A further object of the invention is to provide a roll which can be placed adjacent to a complementary roll, within the confines of a hollow complementary roll or adjacent to the flat surface of a stationary pressure applying body, and wherein the compensation for flexure of the shell can be effected with a higher degree of accuracy than in heretofore known rolls.

An additional object of the invention is to provide a roll of the above outlined character which can be utilized as a superior substitute for heretofore known rolls in existing calenders, rolling mills and/or like machines or production lines.

Another object of the invention is to provide novel and improved hydrostatic seals between the internal surface of a rotary shell and the bearing elements in a roll of the above outlined character.

The invention is embodied in a roll, particularly for use in calenders, rolling mills or like machines or groups of machines. The roll comprises an elongated carrier (preferably an elongated shaft whose end portions are non-rotatably mounted in the frame of the machine), a hollow cylindrical rotary shell having a cylindrical internal surface which spacedly surrounds the carrier, several bearing elements which are interposed between the shell and the carrier in the interior of the shell and each of which has a convex surface adjacent to the internal surface of the shell and provided with several pockets (the bearing elements preferably form a battery or row extending in parallelism with the axis of the shell and preferably adjacent to the nip which the shell defines with a complementary roll or with a stationary pressure applying body), and a plurality of fluid-operated pressure generating devices interposed between each bearing element and the carrier to urge the convex surfaces of the bearing elements toward the internal surface of the shell. Each pressure generating device defines a plenum chamber (each such pressure generating device preferably includes a cylinder on or in the carrier, or on or in the respective bearing element, and a plunger reciprocably extending into the chamber defined by the associated cylinder and being affixed to the respective bearing element or to the carrier) for pressurized fluid (e.g., oil) and each bearing element has means for admitting pressurized fluid into the respective pockets from more than one plenum chamber. In other words, if each convex surface has two pockets and each plurality includes two pressure generating devices, one of the pockets can receive pressurized fluid from the plenum chamber or cylinder chamber of one of the respective pressure generating devices and the other pocket can receive fluid from the plenum chamber or cylinder chamber of the other pressure generating device. The pressure generating devices of each plurality preferably form a row extending circumferentially of the shell.

The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary transverse sectional view of a roll which embodies one form of the invention, and further showing a portion of a complementary roll which cooperates with the improved roll to define a nip for the passage of a running web therethrough;

FIG. 2 is a plan view of the carrier and bearing elements in the improved roll of FIG. 1;

FIG. 3a is a plan view of three bearing elements;

FIG. 3b is a diagram of forces which are generated by the bearing elements of FIG. 3a in the structure of FIG. 1.

DESCRIPTION OF THE PREFERRED EMBODIMENTS

Figure 4:
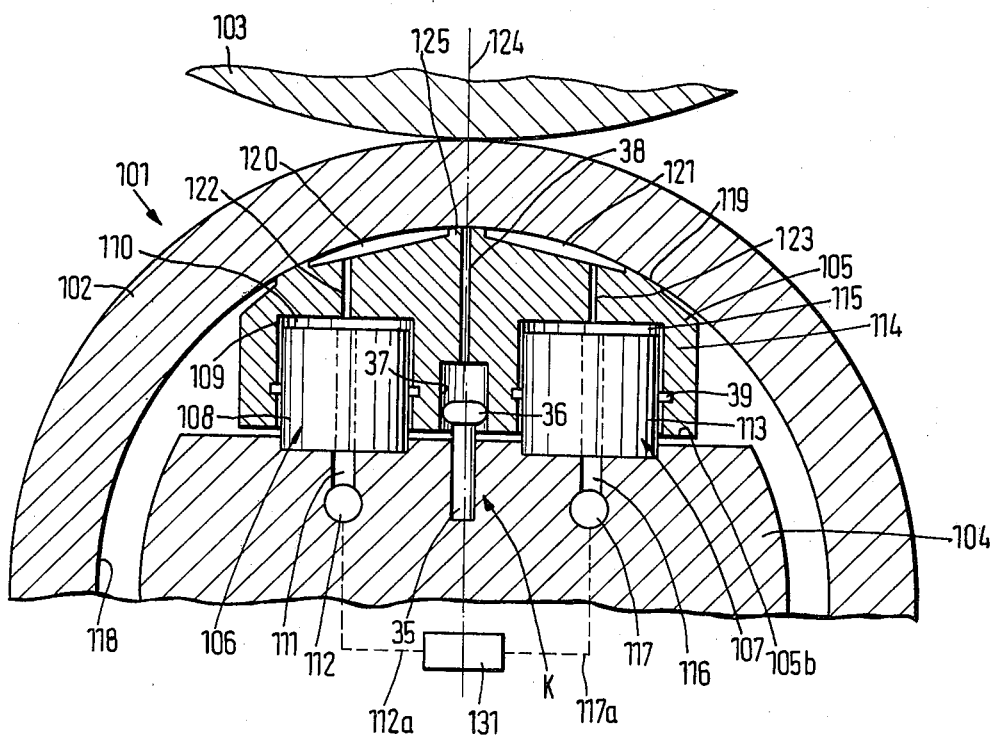
FIG. 4 is a fragmentary sectional view similar to that of FIG. 1 but showing a modified improved roll wherein each bearing element is coupled to the carrier by a universal joint.

FIGS. 1 and 2 illustrate a roll 1 which embodies one form of the invention and cooperates with a complementary roll or counterroll 3. For example, a web of paper, textile material or the like can be caused to pass through the nip N of the rolls 1 and 3 to thereby undergo a surface treatment or the like. The roll 1 comprises a hollow cylindrical shell 2 which spacedly surrounds a stationary carrier 4 in the form of an elongated shaft the end portions of which are mounted in a frame, e.g., in the frame of a calender. Reference may be had to FIG. 2 of the aforementioned commonly owned copending application Ser. No. 097,961 filed Nov. 28, 1979 by Pav et al., now U.S. Pat. No. 4,290,353 granted Sept. 22, 1981. The carrier 4 supports a battery or row of closely adjacent bearing elements 5 having convex upper surfaces 19 closely adjacent to the corresponding portion of the cylindrical internal surface 18 of the shell 2.

Each of the bearing elements 5 is biased upwardly, as viewed in FIG. 1, by two fluid-operated pressure generating devices 6 and 7. The device 6 is a hydraulic motor in the form of a cylinder and piston unit and comprises a cylindrical plunger 8 which is fixedly secured to (e.g., recessed into) the carrier 4 and a cylinder 9 forming part of the respective bearing element 5 and defining a cylinder chamber or plenum chamber 10. The admission of pressurized fluid (e.g., a hydraulic fluid) into and the evacuation of such fluid from the chamber 10 is regulated by a control unit 31 and takes place by way of channels 11 and 12 machined into the carrier 4. The device 7 comprises a cylindrical plunger 13 which is fixedly secured to the carrier 4 and extends into the plenum chamber 15 of a cylinder 14 forming part of the respective bearing element 5. The admission of pressurized fluid into and the evacuation of fluid from the plenum chamber 15 take place by way of channels 16, 17 which are machined into the carrier 4 and wherein the flow of fluid is regulated by the control unit 31.

The convex surface 19 of each bearing element 5 has two pockets or recesses 20, 21 which are mirror symmetrical to one another with reference to a plane 24 that includes the axes of the shell 2 and counterroll 3. The pockets 20, 21 form part of a hydrostatic seal between the respective bearing element 5 and the shell 2, and these pockets respectively receive pressurized fluid from the plenum chambers 10, 15 by way of flow restricting or throttling bores or passages 22, 23 machined into the respective bearing element 5.

The pockets 20 and 21 of each bearing element 5 are separated from each other by an elongated ridge or land 25 which is halved by the symmetry plane 24 and is parallel to the axes of the rolls 1 and 3. Furthermore, each of the two pockets 20, 21 in a bearing element 5 is partially surrounded by two parallel ribs or lands 26, 27 which are parallel to one another, normal to the respective land 25, and extend in the circumferential direction of the shell 2 (see particularly FIG. 2). The remaining portions of the pockets 20, 21 are respectively surrounded by arcuate (substantially semicircular) ribs or lands 28 whose centers of curvature are located on the axes of the corresponding passages 22 and 23. Each bearing element 5 has two substantially parallel transverse surfaces or side faces 29 and 30 which extend in the circumferential direction of the shell 2. FIG. 2 shows that the surface or side face 29 of each bearing element 5 is immediately or closely adjacent to the surface or side face 30 of the neighboring bearing element 5, i.e., the width of clearances or gaps 5a between the neighboring bearing elements is small or negligible.

The control unit 31 is designed to allow for individual regulation of pressure in each of the plenum chambers 10, 15 (and hence in each of the pockets 20, 21) and/or for simultaneous regulation of fluid pressure in a selected group or set of two or more plenum chambers 10 and/or 15. The exact details of the control unit 31 which is designed to allow for such selective adjustment of pressure in the plenum chambers 10 and 15 are not illustrated in FIG. 2; this Figure merely shows discrete connections 12a and 17a between the control unit 31 and each of the channels 12 and 17. The manner in which the pressure in each of the plenum chambers 10, 15 can be varied, either simultaneously with a change of pressure in one or more other plenum chambers or independently of each other plenum chamber, is somewhat similar to that disclosed in the aforementioned copending application Ser. No. 097,961 except that the roll of the copending application Ser. No. 097,961 employs several sensors which energize or deenergize selected electromagnets whereas the sensors (not shown) which are utilized in the roll 1 of FIGS. 1 and 2 serve to transmit signals to the control unit 31 for the purpose of initiating the admission, or for initiating the termination of admission, of pressurized fluid into one or more selected pockets 20, 21 and the corresponding plenum chambers 10, 15. The sensors monitor the pressure which is applied to the roll 1 and/or the extent of deformation of the shell 2.

FIG. 3a shows three neighboring bearing elements 5 and their pockets 20, 21 adjacent to a coordinate system (FIG. 3b) wherein the forces (P) are measured along the abscissa and the dimensions (x) of the bearing elements 5 (as considered in the axial direction of the roll 2), are measured along the ordinate. The forces P act between the bearing elements 5 and the shell 2. It is assumed that the pressure in each of the pockets 20 is the same as in the corresponding pocket 21. The curves 32 denote variations of the force P, and it will be seen that the magnitude of such force varies in the dependency on changes in the width of the respective bearing element 5 (as considered in the circumferential direction of the shell 2). Otherwise stated, the magnitude of the force P varies as a function of changes in the width of the respective pocket 20 or 21, again as considered in the circumferential direction of the shell 2. Since each of the pockets 20, 21 has a minimum width all the way from the land 26 to the respective land 27, the magnitude of the force P never decreases below a minimum or initial value P1. The entire active surface is adjacent to the nip N of the rolls 1 and 3, i.e., the effect of the force P is most pronounced in the region where the roll 1 is nearest to the complementary roll 3. The variation from the minimum value P1 to the maximum value P2 (in the region of maximum width of the respective pocket 20 or 21) is of no particular consequence, i.e., it does not appreciably influence the pressure between the rolls 1 and 3. The broken lines 33 denote the progress of force P in the region 34 of transition between the arcuate land 28 and the land 26 or 27 of a pocket 20 or 21. Since the convex surfaces 19 of the bearing elements 5 are closely adjacent to each other, a reduction of the force P between the neighboring bearing elements 5 (i.e., in the gaps 5a) has no bearing on the configuration of the shell 2, i.e., it cannot entail any pronounced deformation of the shell due to the absence of a continuous convex surface, as considered in the axial direction of the roll 1.

FIG. 2 shows that, in contrast to conventional bearing elements, pressure generating means each having the same diameter as that of the pressure generating device for a conventional bearing element can furnish a force which is twice the force achievable in a conventional roll, or that one can generate the same force while utilizing a fluid whose pressure is only one-half the pressure of fluid in a conventional roll. Furthermore, one can readily satisfy the requirement that each bearing element produce the same force (at a given pressure of fluid) with two pressure generating devices as heretofore with a single pressure generating device. This renders it possible to further reduce the length of the bearing elements 5, as considered in the axial direction of the shell 2. In other words, the diameters of the plungers 8 and 13 can be greatly reduced so that the shell 2 can accommodate a very large number of relatively narrow bearing elements; this exhibits the advantage that the pressure can be regulated with an extremely high degree of precision from increment to increment of the shell 2, as considered in the axial direction of the rolls 1 and 3.

It will be noted that the pressure generating devices 6, 7 of each plurality or group form a row extending circumferentially of the shell 2 and that the chambers 10, 15 respectively communicate with the pockets 20 and 21, i.e., the pockets (20, 21) of any given bearing element 5 receive or can recieve pressurized hydraulic fluid from more than one plenum chamber. The provision of several pressure generating devices for each bearing element 5 renders it possible to multiply the force which, at a given fluid pressure, can be transmitted to the shell 2 without it being necessary to increase the length of the bearing elements, as considered in the axial direction of the roll 1. In other words, by the simple expedient of placing a plurality of preferably identical pressure generating devices side-by-side (as considered in the circumferential direction of the shell 2), one can generate greater forces per unit length of the shell 2 (again, as considered in the axial direction of the roll 1). Consequently, the roll 1 can stand very high stresses or, alternatively, one can generate forces of the same magnitude as in conventional rolls but by resorting to a hydraulic fluid whose pressure is a fraction of the pressure needed in a conventional roll. A reduction of fluid pressure entails a substantial reduction of leakage of fluid from the pockets 20 and 21; furthermore, a reduction of fluid pressure entails substantial savings in energy.

If the pressure generating devices 6 and 7 receive a hydraulic fluid whose pressure is the same or close to that in a conventional roll, the shell 2 is subjected to the action of very pronounced forces which oppose its deformation, e.g., under the action of the complementary roll. The pronounced forces can be achieved without the risk of generating stresses with pronounced peaks which would be likely to affect the integrity of the roll. Such peaks are avoided for reasons which are shown in FIG. 3b, i.e., the forces denoted by the curves 32 have minimum values P1 which are well above zero value. This is attributable to the configuration of bearing elements 5 and of their pockets 20, 21 as well as of lands which surround such pockets. If each of the forces denoted by the curves 32 were to have a zero value at the one or the other axial end of the respective bearing element 5, the peaks of such forces would be very pronounced, i.e., the difference between a force $P_{min}=0$ and the force P2 would be substantial. In the roll of the present invention, the forces merely fluctuate between the minimal values P1 and the maximum values P2, the minimal values P1 being well above zero.

The bearing elements 5 can extend in the circumferential direction of the shell 2, i.e., the width of such bearing elements (as measured from the left to the right in FIG. 1 or 2) can be several times the length (as measured in the axial direction of the roll 1) because the pockets 20 and 21 are or can be located in the region of the plane 24, i.e., of a plane which is the symmetry plane for the pockets 20, 21 of each convex surface 19 and for the pressure generating devices 6, 7 of each plurality or pair, and which also includes the axis of the counterroll 3. In other words, the plane 24 extends midway and lengthwise of the nip N of the rolls 1 and 3 shown in FIG. 1.

It is also within the purview of the invention to utilize three or more pressure generating devices for each of the bearing elements 5, i.e., to place a row of more than two pressure generating devices between each bearing element 5 and the carrier 4 so that the axes of such pressure generating devices will be located in a plane making with the symmetry plane 24 an angle of 90 degrees. Two pressure generating devices for each bearing element are preferred at this time because this renders it possible to simplify the paths along which the pressurized fluid flows into such relatively small number of pressure generating devices and thence into the corresponding pockets 20, 21. However, such design renders it possible to provide relatively short paths (channels, bores, passages, grooves or the like) for the flow of pressurized fluid between the control unit 31 and the plenum chambers 10, 15 as well as between the plenum chambers and the corresponding pockets.

Another important advantage of the improved roll is that the width of the gaps 5a is small or negligible. This renders it possible to place the neighboring bearing elements 5 into immediate proximity to each other. The gaps 5a are flanked by parallel surfaces (29, 30) of such neighboring bearing elements. As mentioned above, the assembling of a large number of bearing elements 5 in the form of a row which is parallel to the axis of the shell 2 and is disposed between the carrier 4 and the nip N of the rolls 1, 3 renders it possible to regulate, with a very high degree of accuracy, the magnitude of forces which act upon the shell 2 and tend to oppose its flexing in response to pressure which is applied by the complementary roll 3. Moreover, the forces acting upon the shell 2 are very pronounced even if the pressure of fluid which is admitted into the cylinder chambers 10, 15 is relatively low. Furthermore, and since the configuration of the pockets 20, 21 is such that they cause the forces to develop or to be distributed in a manner as shown in FIG. 3b, the difference between the maximum and minimum forces is not as pronounced as in conventional rolls where the forces fluctuate between zero and a maximum value. This is of advantage regardless of whether the pressure of fluid is varied individually in each of the plenum chambers or simultaneously in sets or groups of selected plenum chambers. The configuration of the pockets 20 and 21 renders it possible to reduce the dimensions of the bearing elements 5, as considered in the axial direction of the roll 1, without reducing the areas of the pockets, i.e., without adversely affecting the hydrostatic seals between the surfaces 18 and 19. Otherwise stated, the areas of the pockets 20, 21 are relatively large when compared with the length of the bearing elements 5. The larger the number of bearing elements 5, as considered in the axial direction of the roll, the more accurate adjustment of configuration of the shell 2 can be achieved by the pressure generating devices 6, 7 and bearing elements 5, i.e., each and every relatively small portion of the shell 2 can be subjected to the action of a force which fully counteracts the pressure to which such relatively small portion of the shell is subjected by the complementary roll 3 and/or by the material which is caused to advance through the nip N of the rolls 1 and 3.

The number of bearing elements 5 can be increased by ensuring that the length of each bearing element (as considered in the axial direction of the shell 2), does not appreciably exceed the diameter of a plenum chamber 10 or 15, i.e., that the length of each bearing element equals the diameter of the chamber 10 or 15 plus twice the wall thickness of the cylinder 9 or 14. Such wall thickness is selected with a view to ensure that the cylinders 9 and 14 can stand the anticipated maximum pressures of fluid in the respective chambers 10 and 15.

FIGS. 1 and 2 illustrate one of the presently preferred embodiments of the roll wherein the diameters of the plenum chambers 10, 15 are identical and wherein the pressure generating devices 6, 7 are mirror symmetrical to each other with reference to the plane 24 which includes the axes of the rolls 1 and 3. Such design renders it possible to increase the magnitude of forces acting on the shell 2 by 100 percent while the pressure of fluid is the same as in a roll wherein each bearing element is biased by a single pressure generating device. Alternatively, it is possible to reduce the pressure of fluid in half with attendant advantages as concerns reduction of leakage of fluid from the pockets and a reduction of the energy requirements of means for supplying pressurized fluid to the chambers 10 and 15. Furthermore, the length of peripheral surfaces of the bearing elements 5 is not excessive if the elements 5 are configurated and the corresponding pressure generating devices distributed in a manner as shown in FIGS. 1 and 2. While it is conceivable and possible to associate each pressure generating device with two or more pockets, the construction which is shown in FIGS. 1 and 2 is preferred at this time because the cost of manufacturing the bearing elements 5 (i.e., of machining the pockets) is relatively low, the dimensions of the bearing elements are not excessive (not only as considered in the axial direction but also as considered in the circumferential direction of the shell 2), and also because a single flow restricting bore suffices to provide for the flow of necessary fluid from the chamber of a pressure generating device into the respective pocket 20 or 21.

The provision of arcuate lands 28 is desirable and advantageous because they contribute to a reduction of the combined length of lands which surround the pockets 20 and 21, i.e., they reduce the likelihood of leakage of fluid from the pockets since the leakage is proportional to the length of surfaces surrounding the pockets. The arcuate lands 28 surround those portions of the pockets 20 and 21 which are remotest from the symmetry plane 24, and the centers of curvature of the lands 28 are preferably located on the axes of the corresponding pressure generating devices 6 and 7. This ensures that at least a substantial portion of each pocket is substantially concentric with the nearest or corresponding pressure generating device 6 or 7. The configuration of the pockets deviates from such concentricity in the regions which are adjacent to the plane 24, i.e., where the pockets are bounded by the land 25 (this elongated land is halved by the plane 24) and by the lands 26, 27 which are parallel to one another and extend in the circumferential direction of the shell 2.

The control unit 31 exhibits the advantage that each and every pocket 20 and/or 21 can be filled with pressurized fluid at a given pressure which may but need not be the same as the pressure in the other pocket or pockets. Otherwise stated, the control unit 31 allows for a selection of pressures in the plenum chambers 10 and 15 of all pressure generating devices 6 and 7 in such a way that the pressure in all chambers 10 is the same, that the pressure in some of the chambers 10 is the same, that the pressure in all of the chambers 15 is the same, that the pressure in some of the chambers 15 is the same, that the pressure in some of the chambers 10 and 15 is the same, or that the pressure in all of the chambers 10 and 15 is the same, depending on the magnitude and distribution of pressure acting against the exterior of the shell 2. The just described mode of operation of the control unit 31 further allows for elimination or prevention of deformation of the shell 2 under the action of forces acting substantially tangentially of the shell, e.g., those forces which develop as a result of friction between the external surface of the shell and the material which is caused to advance through the nip of the rolls 1 and 3 and/or as a result of friction between the surfaces of the shell 2 and roll 3. The just discussed forces need not be exactly tangential to the external surface of the shell 2, i.e., they can also act against the shell radially inwardly of its external surface but in a direction at right angles or substantially at right angles to the plane 24.

All such parts of the structure shown in FIG. 4 which are identical with or clearly analogous to corresponding parts of the structure shown in FIG. 1 are denoted by similar reference characters plus 100. Thus, the roll 101 of FIG. 4 corresponds to the roll 1 of FIGS. 1 and 2, the counterroll or complementary roll 103 of FIG. 4 corresponds to the counterroll 3 of FIG. 1, and so forth. The main difference between the two embodiments is that the structure of FIG. 4 further comprises a joint K which allows for tilting of the illustrated bearing element 105 about an axis that is parallel to the axis of the shell 102 as well as about an axis that is normal to the just mentioned axis but the joint prevents any lateral shifting of the bearing element, i.e., the bearing element 105 cannot move to the left or to the right and/or toward or away from the observer of FIG. 4. The joint K comprises a substantially spherical head 36 at the upper end of a shank or support 35 which is anchored in the carrier 104 in the space between the plungers 108, 113. The head 36 extends into a cylindrical socket 37 which is machined into the underside 105b of the bearing element 105. The socket 37 communicates with a bore 38 which extends to the land 125, i.e., to the convex surface 119 of the bearing element 105, so that the head 36 and/or the cylindrical surface bounding the socket 37 is automatically lubricated by hydraulic fluid which leaks from the pockets 120, 121 and penetrates between the internal surface 118 of the shell 102 and the upper side of the land 125.

It goes without saying that each bearing element 105 of the roll 101 shown in FIG. 4 is or can be equipped with a discrete joint K. The number of bearing elements 105 depends on the length of the shell 102. The control unit 131 can admit pressurized fluid into or effect evacuation of fluid from the pockets 120, 121 independently of each other, or it can be designed to simultaneously change the pressure of fluid in selected groups of plenum chambers 110, 115 (and hence in the corresponding groups of pockets 120, 121). The channels 112, 117 are respectively connected with the control unit 131 by conduits 112a, 117a.

The distance between the plenum chambers 110, 115 of the bearing element 105 shown in FIG. 4 is somewhat greater than the width of the lands 25 in the embodiment of FIGS. 1 and 2 because the portion of the bearing element 105 between the plungers 108, 113 must be formed with the socket 37 for the spherical or substantially spherical head 36 of the joint K. However, the increased distance between the plungers 108, 113 (as considered in the circumferential direction of the shell 102) does not influence the width of the land 125, i.e., the width of each pocket 120 or 121 can vary to the same extent and each of these pockets can be dimensioned and configurated in the same way as the pockets 20, 21 of the embodiment shown in FIGS. 1 and 2.

If the shell 102 is subjected to the action of a force which is normal to the symmetry plane 124 (i.e., which acts at right angles to the direction of action of the force with which the roll 103 bears against the roll 101 or against a running web between such rolls), the shell 102 transmits such "transverse" force to the bearing element 105 which, in turn, transmits or applies the force to the stationary carrier or shaft 104 by way of the joint K. In other words, such transverse force need not be taken up by the plungers 108, 113 and/or by the sealing elements 39 which surround the plungers and are recessed into internal grooves of the corresponding cylinders 109, 114. On the other hand, the joint K does not interfere with tilting of the shell 102 relative to the carrier 104, i.e., the shell 102 can be tilted with the bearing element 105 relative to the spherical or substantially spherical head 36 of the joint K about an axis which is parallel to the axis of the shell 102 as well as about an axis which is normal to the axis of the shell. if the bearing element 105 is tilted in response to development of transverse forces, the corresponding sensor or sensors (not shown) detect such changes in orientation of the bearing element 105 and induce the control unit 131 to remedy the situation by changing the pressure of fluid in the plenum chamber 110 and/or 115. Moreover, the control unit 131 can change the pressure in the chamber 110 and/or 115 in the absence of a pronounced transverse force in order to properly orient the bearing element even prior to putting the calender to use, i.e., in order to properly position the convex surface 119 relative to the cylindrical internal surface 118.

The nip between the roll 1 or 101 and a body which cooperates therewith need not be formed by two cylindrical external surfaces. Thus, the complementary roll 3 or 103 can be replaced by a hollow roll which has a cylindrical internal surface one portion of which is adjacent to the external surface of the shell 2 or 102 so that the nip is formed between a cylindrical external surface and a cylindrical internal surface. It is also possible to replace the complementary roll 3 or 103 by a pressure applying body having a flat surface so that the nip is defined by the cylindrical external surface of the shell 2 or 102 and the aforementioned flat surface.

The joints K allow the bearing elements 105 to move radially of the shell 102 because the sockets 37 in the bearing elements 105 are radial or substantially radial bores. Furthermore, the joints K allow the corresponding bearing elements 105 to perform tilting movements about axes which intersect each other in or close to the center of the substantially spherical head 36. The joints K will be resorted to when the forces acting in the axial direction of the shell 102 and/or in a direction at right angles to the plane 124 are very pronounced so that they would be likely to entail rapid destruction of the sealing elements 39 and/or necessitate overdimensioning of the pistons or plungers 108, 113 and/or of the walls of cylinders 109, 114. For example, the joints K will be necessary or desirable if the roll 101 of FIG. 4 is used to drive a web of paper, textile material or the like through the nip of the shell 102 and complementary roll 103 and/or when the plane in which the complementary roll and/or the treated material applies pressure to the shell 102 is inclined to the vertical.

Another advantage of the joints K is that they allow for an even larger number of adjustments of the corresponding bearing elements 105 with reference to the carrier 104 and/or shell 102. For example, and referring to the bearing element 105 of FIG. 4, this bearing element can be pivoted about an axis which is normal to the plane of FIG. 4 and extends through the center of the head 36 by the simple expedient of increasing the pressure in the chamber 110 while reducing the pressure in the chamber 115 or vice versa. Such pivoting of the bearing element 105 might be desirable in order to more accurately conform the orientation of the convex surface 119 to the adjacent portion of the surface 118, for example, to reduce leakage of fluid from the pockets 120 and 121.

The head 36 may constitute a true sphere, or a substantially conical member with a rounded surface portion in the region of contact with the surface bounding the socket 37, without departing from the spirit of the invention. Furthermore, the socket 37 can be machined into or otherwise formed in the carrier 104, and the shank 35 for the head 36 is then anchored in the bearing element 105.

Without further analysis, the foregoing will so fully reveal the gist of the present invention that others can, by applying current knowledge, readily adapt it for various applications without omitting features, that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A roll, particularly for use in calenders or like machines, comprising an elongated carrier; a hollow cylindrical rotary shell spacedly surrounding said carrier and having a cylindrical internal surface; bearing elements forming a row extending in parallelism with the axis of said shell and being interposed between said shell and said carrier in the interior of said shell, each of said bearing elements having a convex surface adjacent to said internal surface and each of said convex surfaces having a plurality of pockets; and a plurality of fluid-operated pressure generating devices interposed between each of said bearing elements and said carrier to urge the convex surfaces of said bearing elements toward said internal surface, each of said pressure generating devices defining a plenum chamber for pressurized fluid and each of said bearing elements having means for admitting pressurized fluid into the respective pockets from more than one plenum chamber, the pressure generating devices of each of said pluralities forming a row, as considered in the circumferential direction of said shell.

2. The roll of claim 1, wherein said bearing elements form a row extending in parallelism with the axis of said shell.

3. The roll of claim 1, wherein the pressure generating devices of each of said pluralities form a fow, as considered in the circumferential direction of said shell.

4. The roll of claim 1, wherein said bearing elements comprise lands surrounding said pockets and the lands for each of said pockets include pairs of substantially parallel lands extending in the circumferential direction of said shell.

5. The roll of claim 4, wherein each of said pressure generating devices comprises a cylinder and a plunger reciprocably extending into the respective cylinder and having a substantially circular cross-sectional outline.

6. The roll of claim 5, wherein said bearing elements include a plurality of neighboring bearing elements which are separated from each other by gaps extending in the circumferential direction of said shell.

7. The roll of claim 6, wherein said neighboring bearing elements have parallel side faces flanking the respective gaps and located in planes which are at least substantially normal to the axis of said shell.

8. The roll of claim 1, wherein said bearing elements include a plurality of neighboring bearing elements separated from each other by narrow gaps extending in the circumferential direction of said shell.

9. The roll of claim 1, wherein each of said pressure generating devices comprises a cylinder defining the respective plenum chamber and a plunger extending into such plenum chamber, said chambers having a circular cross-sectional outline and the length of each of said bearing elements, as considered in the axial direction of said shell, only slightly exceeding the diameters of the respective plenum chambers.

10. The roll of claim 1, wherein each of said pluralities includes two identical pressure generating devices which are mirror symmetrical to one another with reference to a plane including the axis of said shell.

11. The roll of claim 1, wherein the number of pockets in the convex surface of each of said bearing elements matches the number of associated pressure generating devices and each pocket of a convex surface is communicatively connected with a different plenum chamber.

12. The roll of claim 1, wherein the pockets of said convex surfaces form at least one row disposed at one side of a plane including the axis of said shell and the pockets of said row have portions remote from said plane, said bearing elements having arcuate lands surrounding said portions of the respective pockets.

13. The roll of claim 1, wherein each of said convex surfaces has two pockets which are mirror symmetrical to each other with reference to a plane including the axis of said shell, said pockets having portions remote from said plane and each of said bearing elements having arcuate lands bounding said portions of the respective pockets.

14. The roll of claim 1, wherein the pockets of said convex surfaces form at least one row disposed at one side of a plane including the axis of said shell and the pockets of said one row include portions remote from said plane, each of said bearing elements having an arcuate land bounding said portion of the respective pocket, each of said pluralities including a pressure generating device having a cylinder defining the respective chamber and a plunger reciprocable in such cylinder, the centers of curvature of said arcuate lands being located on the axes of the respective cylinders.

15. The roll of claim 1, further comprising means for supplying to the chambers of each of said pluralities of pressure generating devices fluid at a different pressure.

16. The roll of claim 1, wherein the pressure generating devices of each of said pluralities include a pair of pressure generating devices disposed at the opposite sides of a plane including the axis of said shell, and further comprising joints pivotally connecting said bearing elements to said carrier, each of said joints being disposed between the pressure generating devices of the respective pair.

17. The roll of claim 1, wherein each of said joints is operative to permit the respective bearing element to move with respect to said carrier in the radial direction of said shell.

18. The roll of claim 1, wherein each of said joints comprises a socket member and a substantially spherical member extending into said socket member, one of said members being provided on said carrier and the other of said members being provided on the respective bearing element.

19. The roll of claim 18, wherein each of said socket members is a bore extending substantially radially of said shell.

20. The roll of claim 1, wherein each of said bearing elements has lands surrounding the respective pockets and the lands of each of said bearing elements include an elongated land which is halved by a plane including the axis of said shell.

21. The roll of claim 1, wherein each of said convex surfaces has a pair of pockets which are mirror symmetrical to each other with reference to a plane including the axis of said shell and being disposed between the pockets of the respective pair.

22. A roll, particularly for use in calenders or like machines, comprising an elongated carrier; a hollow cylindrical rotary shell spacedly surrounding said carrier and having a cylindrical internal surface; bearing elements interposed between said shell and said carrier in the interior of said shell and each having a convex surface adjacent to said internal surface, each of said convex surfaces having a plurality of pockets; a plurality of fluid-operated pressure generating devices interposed between each of said bearing elements and said carrier to urge the convex surfaces of said bearing elements toward said internal surface, each of said pressure generating devices defining a plenum chamber for pressurized fluid and each of said bearing elements having means for admitting pressurized fluid into the respective pockets from more than one plenum chamber, the pressure generating devices of each of said pluralities including a pair of pressure generating devices disposed at the opposite sides of a plane including the axis of said shell; and joints pivotally connecting said bearing elements to said carrier, each of said joints being disposed between the pressure generating devices of the respective pair.

* * * * *